United States Patent [19]
Kami et al.

[11] Patent Number: 5,853,324
[45] Date of Patent: Dec. 29, 1998

[54] SHOOTING GAME MACHINE AND METHOD OF COMPUTING THE SAME

[75] Inventors: Hirofumi Kami; Masayuki Kikuchi; Shigeki Tohyama, all of Tokyo, Japan

[73] Assignee: Namco Ltd., Tokyo, Japan

[21] Appl. No.: 706,570

[22] Filed: Sep. 5, 1996

[30] Foreign Application Priority Data

Sep. 7, 1995 [JP] Japan .................................. 7-256791

[51] Int. Cl.⁶ ...................................................... A63F 9/22
[52] U.S. Cl. ................................................. 463/2; 463/36
[58] Field of Search .............................. 463/1–8, 36–39, 463/49–53; 273/148 B; 345/156

[56] References Cited

U.S. PATENT DOCUMENTS

| | | | |
|---|---|---|---|
| 4,270,755 | 6/1981 | Willhide et al. ............................. | 463/2 |
| 4,600,200 | 7/1986 | Oka et al. ................................... | 463/2 |
| 5,190,286 | 3/1993 | Watanabe et al. .......................... | 463/5 |
| 5,212,368 | 5/1993 | Hara . | |
| 5,229,756 | 7/1993 | Kosugi et al. . | |
| 5,351,969 | 10/1994 | Smith, III et al. ........................ | 463/5 |

OTHER PUBLICATIONS

Sandler et al. The Official Turbo Grafix–16 Game Encyclopedia, pp. 246–249, Nov. 1990.

*Primary Examiner*—Michael O'Neill
*Attorney, Agent, or Firm*—Oliff & Berridge, PLC

[57] ABSTRACT

A shooting game machine having a gun for shooting at a target displayed on a display. The shooting game machine has a foot-operated input section for being stepped on by a player to select one of attack and defense modes, and a game computing section for computing for a game based on inputs from the foot-operated input section and the gun and a given game program. When the attack mode is selected, the game computing section computes for causing the player to attack and damage an enemy in a game space while the player being exposed to the attacks of the enemy. When the defense mode is selected, the game computing section computes for causing the player to avoid the attacks of the enemy by hiding or taking other actions for avoiding danger.

16 Claims, 13 Drawing Sheets

SHOOTING GAME MACHINE AND METHOD OF COMPUTING THE SAME

BACKGROUND OF THE INVENTION

1. Field of the Invention

The present invention relates to a shooting game machine, and particularly to a shooting game machine for shooting at a target on a display by the use of a shooting device and a method of computing the same.

2. Description of the Related Art

Various types of shooting game machines are widely known.

One of these shooting game machines is such that the game scene thereof has a character representing a player, a moving body controlled by a player or the like. In such a game machine, the player can control the character or moving body to attack the enemies while evading the attack of the enemies.

On the other hand, there is also widely known a shooting game machine in which a gun-like input device is used to shoot targets displayed on a CRT. In such a shooting game machine, the player can enjoy shooting with an increased reality since the player attacks the enemies on the screen by actually operating the gun.

However, in the latter game machine, the player cannot attack the enemies while evading the attack of the enemies, since it is so constructed that the player one-sidedly attacks the enemies on the screen. Even if the enemies on the screen attack the player, the player can only make such an indirect defense action that the player got the enemies down before being subjected to the enemy's attack.

If the player can attack the enemies while hiding behind something or lying down to avoid bullets from the enemies as in movies or actual shoot-out, the player can enjoy a shooting game while performing different attack and defense actions depending on the development of the game, rather than the one-sided shooting action.

However, many shooting game machines of the last-mentioned type have only a main input device in the form of a gun, but do not have any input means by which the player can hide behind something and lie down to avoid bullets from the enemies.

SUMMARY OF THE INVENTION

It is therefore an object of the present invention to provide a shooting game machine for shooting at a target on a display by the use of a shooting device, in which a player can attack an enemy while defending himself or herself from the enemies by hiding behind something and/or lying down within the same game space as for the enemies on the display, and also to provide a method of computing the same.

To this end, the present invention provides a shooting game machine for shooting at a target displayed on a display, comprising:
means used by a player for selecting a defense mode; and
computing means for causing a virtual player in a game space to avoid danger when the defense mode is selected.

The present invention also provides a shooting game machine comprising:
display means;
a shooting device;
mode selecting means for selecting one of an attack mode and a defense mode; and
game computing means responsive to an input from the shooting device for performing a game computation causing a virtual player and an enemy in a game space to shoot at each other when the attack mode is selected and also for performing game computation causing the virtual player in the game space to avoid danger when the defense mode is selected.

The present invention further provides a method of computing performed in a shooting game machine which comprises a mode selecting means for selecting one of an attack mode and a defense mode, and a shooting device for shooting at a target displayed on a display means, the method comprising the steps of:
causing a player to select one of the attack mode and the defense mode through the mode selecting means in a game;
computing for a shooting combat against an enemy in a game space based on an input from the shooting device when the attack mode is selected; and
computing for causing a virtual player in the game space to avoid danger when the defense mode is selected.

The present invention further provides an information storage medium for storing an information for a shooting game in which a mode selecting means for selecting one of an attack mode and a defense mode is used and a shooting device for shooting at a target displayed on a display means is also used, the information storage medium storing:
an information for causing a player to select one of the attack mode and the defense mode through the mode selecting means in a game;
an information for computing for a shooting combat against an enemy in a game space based on an input from the shooting device, when the attack mode is selected; and
an information for computing for causing a virtual player in a game space to avoid danger, when the defense mode is selected.

In a shooting game, it is also an important factor to avoid danger rather than to attack, for example, to evade the enemy's attack. According to the present invention, the player can perform the input through the shooting device and also select the attack or defense mode through the mode selecting means. Thus, the present invention provides a shooting game machine to play a more real shooting game in which the player can attack the enemies while evading the enemy's attack.

According to the present invention, particularly, the player can enjoy a variable shooting game with an increased tense atmosphere, which would never be experienced by any player in the conventional shooting games for only shooting targets.

It is preferred that the mode selecting means is in a form of a foot-operated input means which is operated by the player to select one of the attack mode and the defense mode.

Since the player can select the attack or defense mode by the foot, the player can operate the shooting device by the hand as in the prior art. Furthermore, the input operation in the game will not be complicated since the input operation can be carried out by the use of both the hands and foot of the player, in comparison with the case where the all input operations are performed only by the player's hands. This enables a beginner to make an easy input operation as well.

The mode selecting means may include an inclination sensor which is disposed in the shooting device for sensing a given inclination of the shooting device operated by the player, wherein the mode selecting means selects one of the attack mode and the defense mode on the basis of sensed inlination of the shooting device.

For example, the inclination sensor may be formed by utilizing the conductivity of mercury to sense an inclination of the shooting device at the given angle.

Thus, the player can use the shooting device not only for shooting, but also for selecting the attack or defense mode. Therefore, the input operation of the game will not be complicated. Any beginner can easily perform the input operation as well.

The mode selecting means may include:

player position detecting means for detecting a position of the player; and position determining means for determining whether it is the attack mode or the defense mode based on a detected position of the player; and wherein the player selects one of the attack mode and the defense mode by moving between an attack mode position and a defense mode position while watching a game scene on the display means.

Since the player can select the attack or defense mode by moving, the player can enjoy the shooting game by body actions similar to those of the actual combat as well as the gun operations.

For example, by setting the defense mode position at a position where the player can hide actually behind something, the player can enjoy a virtual combat as shown in the game scene.

The game computation means may comprise a timer means for measuring duration of the attack mode selected by the mode selecting means, and an attack ability control means for varying an attack ability of the enemy according to the measured duration.

The game computation means may further comprise an attack frequency measuring means for measuring an attack frequency of the enemy during the attack mode selected by the mode selecting means, and an attack ability control means for varying an attack ability of the enemy according to the attack frequency measured by the attack frequency measuring means.

In such an arrangement, the attack ability of the enemy may be set to be first low and to gradually increase in the attack mode. Once the player has shifted to the defense mode, the attack ability of the enemy is then reset.

The attack ability of the enemy may be any factor determining the power of the enemy such as the hit rate of the enemy's attack to the player, the destructive power of the enemy's arm, the number of enemies and so on. In this way, the attack ability of the enemy can be increased as the duration of the attack mode becomes longer.

The player can attack the enemy, but at the same time is exposed to the enemy's attack when the player is in the attack mode.

It is now assumed that the factor determining the power of the enemy is the hit rate of the enemy's bullets shot at the player. In such a case, when the hit rate is set to be higher, the enemy's bullets will more easily hit the player immediately after the player shifts to the attack mode. This means that the player may be defeated before the player attacks the enemy. Particularly when a beginner plays the game, the player cannot easily grasp the rhythm in the enemy's attack. It is therefore possible that the game will terminate before the player satisfactorily enjoys the game.

If the aforementioned hit rate is set to be too low, the tension in the game may be lost since the enemy's bullets less hit the player. In such a case, the player cannot find amusement inherent in the shooting game wherein the attack or defense is properly used.

However, the present invention can eliminate the case when the game terminates before the players including the beginner satisfactorily enjoy the game since they can be less defeated immediately after the game mode is shifted to the attack mode. Because it is set that the power of the enemy increases as the attack mode is longer continued, the player himself or herself will judge whether or not the attack mode should be shifted to the defense mode in the game. As a result, a shooting game machine can be provided in which the player can enjoy the shooting game while spontaneously shifting the attack mode to the defense mode or vice versa.

It is further preferred that the game computing means comprises a reload control means for reloading an attack ability of the player in response to a shift between the attack mode and the defense mode.

By reloading, the player can attack repeatedly. The player's attack ability controlled by the reload control means may be the number of bullets which can be shot by the player, attack ability of the shooting device, energy necessary for the player's attack, or the like.

When the attack ability of the player is reloaded based on the shifting operation between the attack mode and the defense mode, a shooting game machine can be provided in which the player can spontaneously perform the shifting operation between the attack mode and the defense mode.

The foot-operated input means may comprise a shift pattern input means for inputting a shift pattern from the defense mode to the attack mode, wherein the game computing means performs a computation based on an inputted shift pattern for an action of the virtual player who shifts from the defense mode to the attack mode.

Thus, a plurality of patterns for shifting to the attack mode from the defense mode can be set. These shift patterns may include a shift pattern in which the virtual player rapidly jumps to attack the enemy, or another shift pattern in which the player gradually moves. Furthermore, the position of the player after the mode shift may be varied depending on a selected shift pattern.

In such an arrangement, the shift pattern selected by the player is also an important factor for the game development. As a result, a shooting game machine can be provided in which the player can enjoy a variety of attacks.

The shift pattern input means may include a pressure sensor for sensing a pressure put on by the player to input a shift pattern according to the sensed pressure.

Thus, the player can input a shift pattern from the defense mode to the attack mode by controlling the pressure put on the foot-operated input means. For example, the foot-operated input means can be set to input a shift pattern in which the virtual player jumps and attacks the enemy quickly when the player steps on the foot-operated input means quickly. Thus, the player can input the shift pattern reasonably.

In a shooting game machine wherein the game scene on the display is a view of the player, it is preferred that the game computation is carried out to represent the game scene at a quick shift to the attack mode as a view of a jumping virtual player.

The display means of the present invention may be in a form of a head-mount display.

When the player selects the attack or defense mode by moving himself or herself to the attack or defense mode position while viewing the game scene on the conventional display means, the player less gets a feel to be in the game space on the screen, with a poor reality. Furthermore, a substantially large display means is required when the player must shoot a target or targets while moving.

When the head-mount display is used, however, the view of the player is equal to the game space. Therefore, a shooting game machine can be provided in which the player can enjoy a virtual combat while having such a feel that the player actually exists in the game space.

DETAILED DESCRIPTION OF THE PREFERRED EMBODIMENTS

Some preferred embodiments of the present invention will now be described in detail with reference to the drawings.

Figure 1:
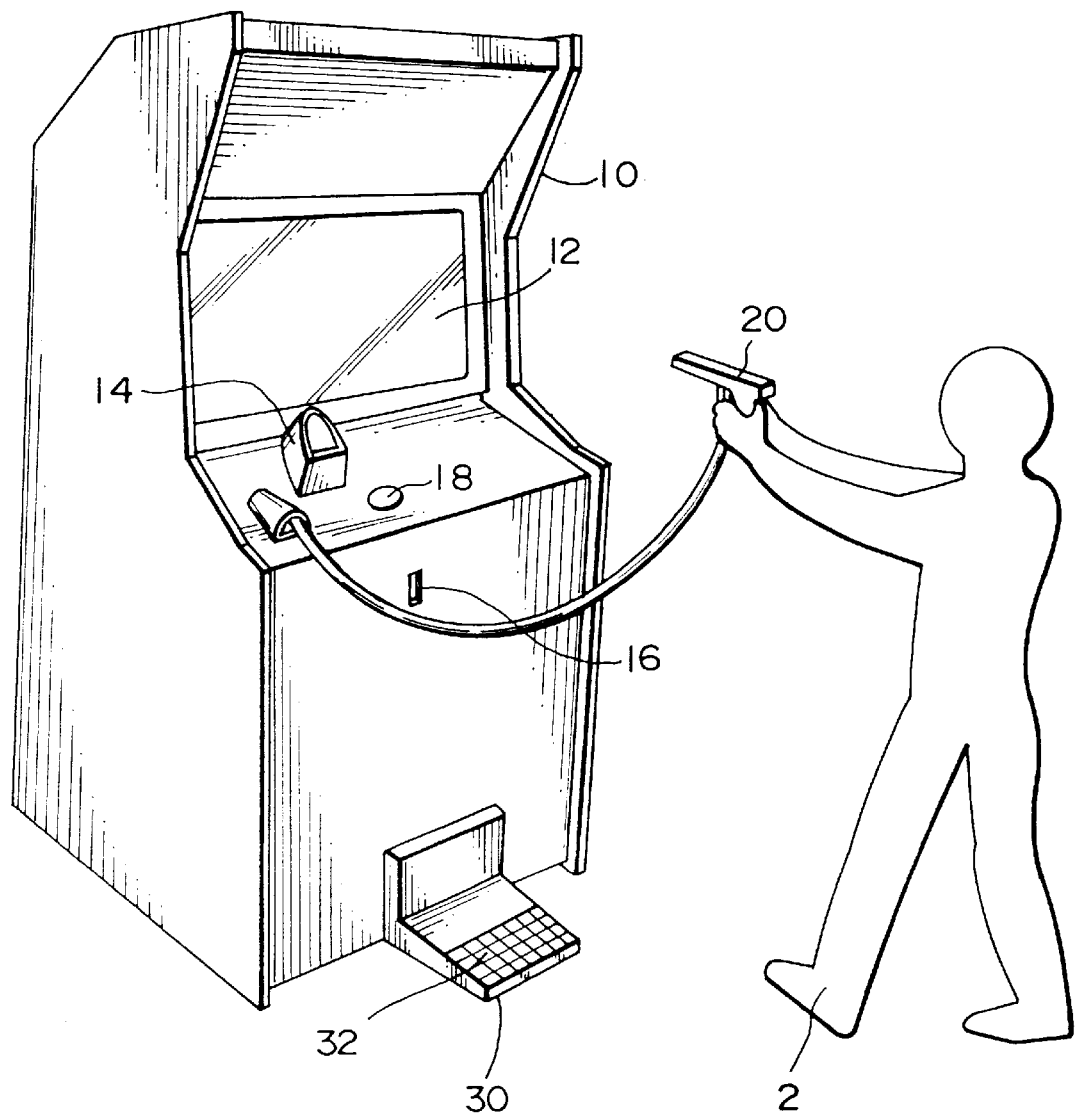
FIG. 1 is a perspective view of an example of a shooting game machine into which the present invention is embodied.

FIG. 1 shows a perspective view of the appearance of a shooting game machine into which the present invention is embodied. The shooting game machine comprises a housing 10 within which a display 12 is located facing to a player 2. The display 12 may be of raster scan type and is a CRT in this embodiment.

The front side of the housing 10 includes a gun case 14 in which a gun 20 is received. The gun 20 is connected to an internal circuit in the housing 10 through a cable.

The lower part of the housing 10 includes a coin slot 16. When the player depresses a start button 18 after a coin is dropped into the coin slot 16, a shooting game is started.

When the player 2 stands against the display 12 with the gun 20, a game scene is displayed on the display 12. The player can range the gun against targets successively displayed on the game scene and pull a trigger for enjoying the shooting game.

The appearance of the shooting game machine is basically similar to that of the conventional shooting game machines except that the front and lower part of the housing 10 includes a foot-operated input section 30 which can be operated by the player with his or her foot. The foot-operated input section 30 functions as a mode selecting means which is used by the player for selecting one of an attack mode and a defense mode, depending on the development of the game. This will be described later in more detail.

Figure 2:
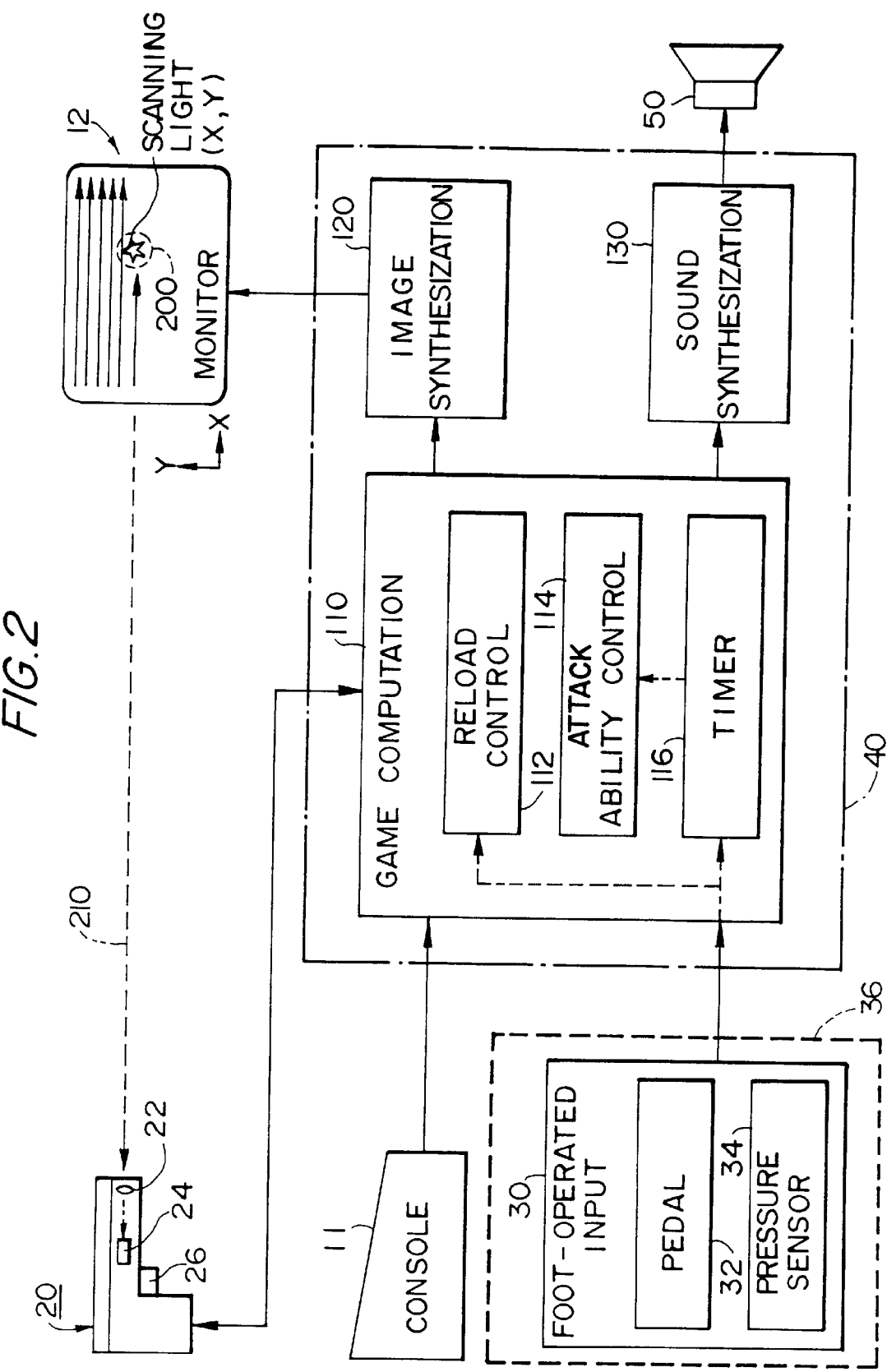
FIG. 2 is a block diagram of the structure of the shooting game machine of the present embodiment.

FIG. 2 shows a structure of the game machine of this embodiment.

In the shooting game machine of this embodiment, a game program control block (PCB) 40 computes and displays game scenes on the display 12 in accordance with a given game program, these game scenes successively displaying targets each having an attack ability.

The game PCB 40 comprises a game computing section 110 for computing the game scenes in accordance with the given game program, an image synthesizing section 120 for displaying the computed game scenes on the display 12 and a sound synthesizing section 130 for synthesizing and outputting sound signals through a speaker 50 depending on the development of the game.

The game computing section 110 starts the game in response to the depression of the start button 18 in a console section 11.

When the player pulls the trigger of the gun 20 to shoot at the targets, the game computing section 110 detects a supposed impact position. If the impact position coincides with the position of a target, it is determined that an imaginary bullet hits that target. An image of the target hit by the bullet is then displayed. Therefore, the player can visually recognize whether or not the target is hit.

The operation of the game computing section 110 which detects a supposed impact position on the display 12 when the trigger 26 of the gun 20 is pulled by the player will be described below.

The barrel of the gun 20 includes a light receiving part. More particularly, the gun barrel is hollow and includes a lens 22 in the muzzle thereof and a light sensor 24 in the barrel behind the lens. Light 210 entering the muzzle lens 22 along the axis of the gun barrel can be sensed by the light sensor 24.

The light sensor 24 has a detectable range 200 having a diameter of several centimeters on the display 12. As the raster scanning line of the display 12 passes through the detectable range 200, the light sensor 24 detects it and outputs a detection signal depending on the amount of the received light toward the game computing section 110.

In this embodiment, when the player ranges the gun on a target and pulls the trigger 26, a trigger signal is outputted to the game computing section 110. The game computing section 110 receives the trigger signal and controls the image synthesizing section 120 to flash the display 12 at the next interlaced scanning. When the raster scanning is carried out on the display 12 with an amount of light beyond a predetermined level, the light sensor 24 detects it and outputs a detection pulse to the game computing section 110. So that when the display 12 is flashed, the game computing section 110 receives the detection pulse from the light sensor 24, and computes X and Y coordinates of the impact position on the display based on the horizontal and vertical positions of the detected raster scanning line. The game computing section 110 determines whether or not this impact position is within a hit area of the target and then performs a hit representation or a no-hit representation.

The shooting game machine of this embodiment has three types of game fields, each of which consists of four areas. Each of these areas includes four or five shooting points which will be described later. There are some requirements for each area, and if the player cannot fill the requirements in a limited time, the game will be terminated. The player has a given number of "lives", one of which will be lost each time when the player is shot by an enemy in the game. When all "lives" are lost, the game will be terminated.

In the shooting game of this embodiment, the player attacks enemies in the displayed scene while being subjected to the attacks from the enemies.

This embodiment is characterized by that the player properly uses the attack and defense modes through the foot-operated input section 30 to perform a shooting combat with the enemies. In the attack mode, the player can attack and damage the enemies while being subjected to the attacks from the enemies. In the defense mode, the player can evade the attacks from the enemies and any other danger by hiding behind something. The player can fight a shooting combat only at each shooting point. When all the enemies around one shooting point are defeated, the player will proceed to the next shooting point.

FIGS. 3–6 illustrate various game scenes at a shooting point in the attack and defense modes.

The remaining time 360 in the game is displayed on the central and upper part of the game scenes. The remaining time 380 reduces in real time with progress of the game. As the remaining time 380 reaches zero, the game is terminated. Six "life" marks 390 are displayed on the leftward and lower part of the screen at beginning of the game. These "life" marks 390 is decreased by one at each time when the player is shot by the enemies. As the number of the "life" marks 390 becomes zero, the game is terminated. The number of remaining bullets 370 of the player and a time 400 are displayed on the rightward and lower part of the screen. The former represents the number of imaginary bullets that can be shot by the player. As the number of bullets reaches zero, the player must release a pedal 32 for reloading as described below. The time 400 indicates a play time in one game field counted from the start. The time count can be recorded for each game field and used to estimate the player's skill based on the total time when the game is terminated. In a case where a time trial is to be performed, the player can know a present play time by the time 400.

Figure 3:
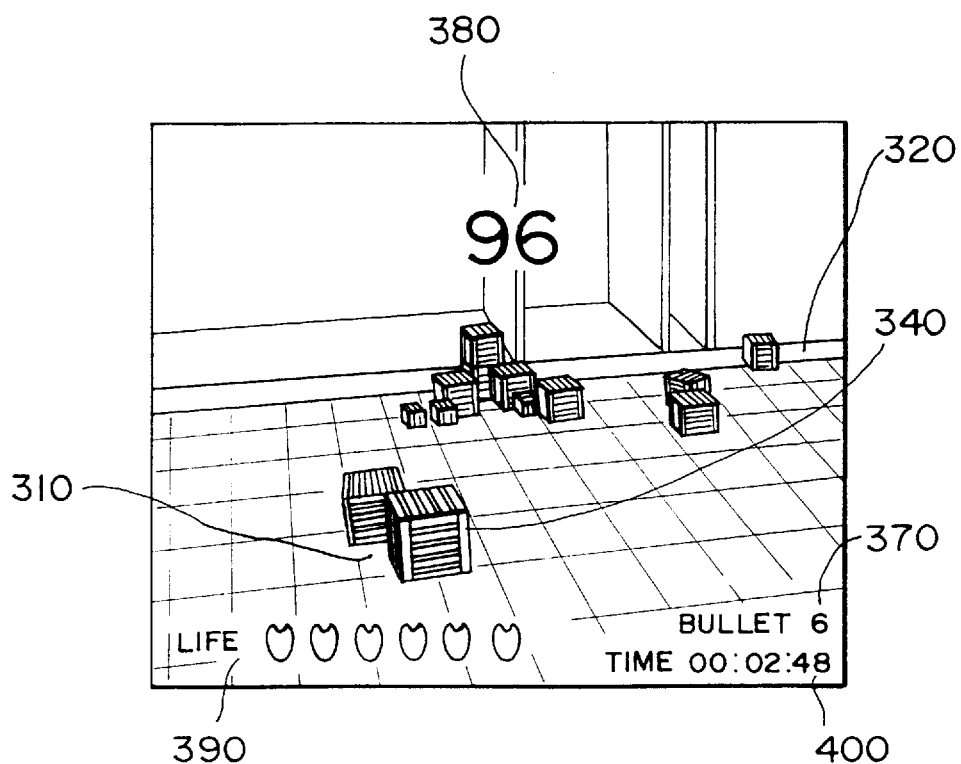
FIG. 3 illustrates a game scene in the present embodiment.

The game scene of FIG. 3 shows one shooting point 310 behind two wooden boxes. When the player moves to this shooting point 310, such a point becomes a player combat position. Thus, the player in this position can shoot an enemy who is at an enemy combat position 320 shown in FIG. 3 at the rightward part while evading the bullets from the enemy by hiding behind the wooden boxes.

Since the real player cannot be in the virtual three-dimensional game space in which the displayed enemies exist, a virtual player not displayed on the game scenes is imagined in the shooting game machine of this embodiment. When the player selects the attack or defense mode through the foot-operated input section 30, the virtual player will be placed in the attack or defense mode. At this time, the view of the virtual player is displayed as a game scene.

As the game is started, a scene overlooking a shooting point as shown in FIG. 3 is first displayed on the display as a view of the virtual player. The viewpoint of the virtual player is gradually moved from the overlooking position of FIG. 3 to the player combat position 310 at which the shooting combat is to be performed. The view of the virtual player during this movement is displayed on the game scene. During this movement, both the player and enemy 330 cannot attack each other. The machine does not receive any input from the gun 20 and foot-operated input section 30.

As the movement terminates, the combat will be started with the virtual player 300 being in the defense mode at the player combat position 310 behind the wooden boxes 340.

Figure 7A:
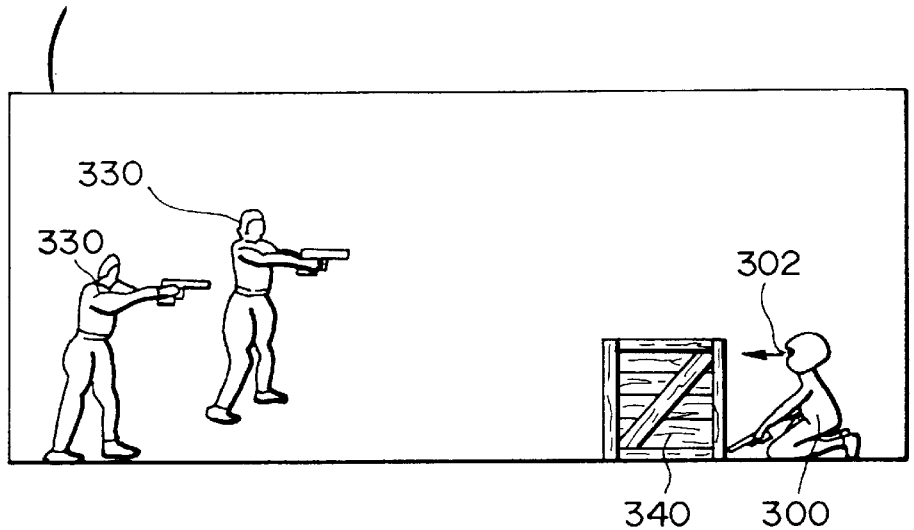
FIGS. 7A–7C are side views illustrating the positions of the virtual player in the game space.
Figure 7B:
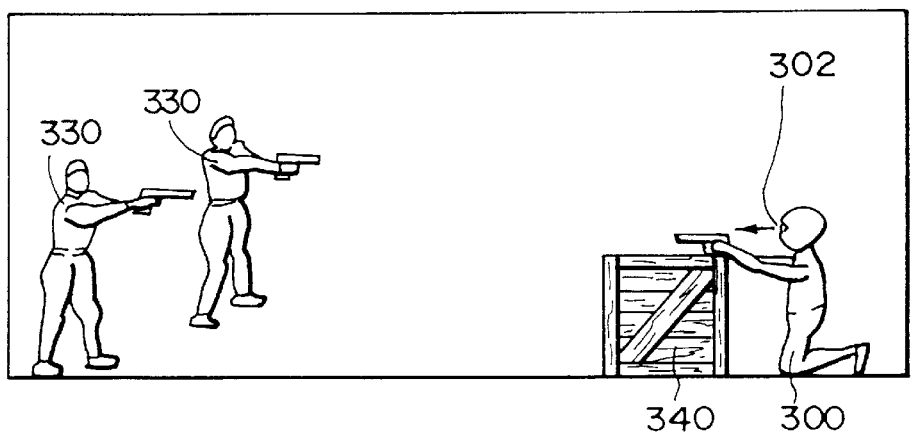
Figure 7C:
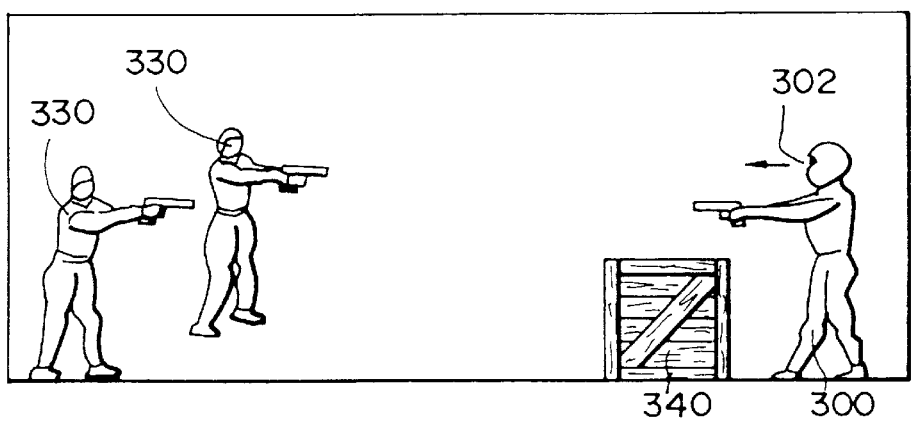

FIGS. 7A–7C illustrate various positions of the virtual player 300 in the virtual three-dimensional game space. FIGS. 7A and 7C represent the defense and attack modes, respectively.

Figure 4:
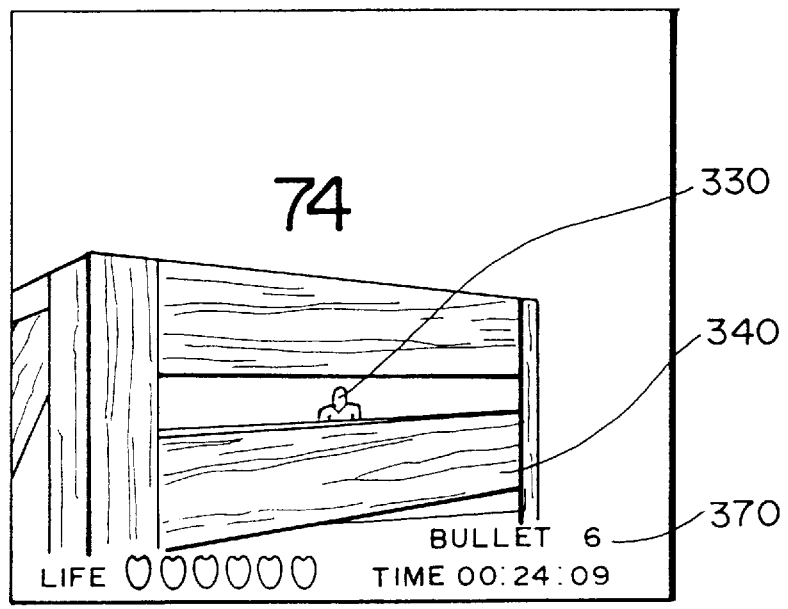
FIG. 4 illustrates another game scene in the present embodiment.

In the defense mode, the virtual player 300 is in such a position relative to the wooden box 304 as shown in FIG. 7A. On the display, a game scene which is a view from the viewpoint 302 of the virtual player 300 in FIG. 7A is displayed, as shown in FIG. 4.

In the shooting game machine of this embodiment, the game is in the attack mode when the player is operating the foot-operated input section 30, and the game is in the defense mode when the foot-operated input section 30 is released.

When the combat is started, the enemies 330 visible through a gap in the wooden box begin shooting. If the player selects the defense mode (or the foot-operated input section 30 is released), the virtual player 300 can evade the attacks of the enemies 330 since the virtual player 300 is behind the wooden box as shown in FIG. 7A. More particularly, in the defense mode, the virtual player will not be defeated by the enemies 330, but also cannot attack the enemies 330. Since a time is limited, however, the virtual player must find an opportunity and come out from behind the wooden box to defeat the enemies 330. If the player steps on the foot-operated input section 30, the virtual player 300 comes out from behind the wooden box as shown in FIG. 7C, wherein the virtual player 300 is in the attack mode.

The view point 302 of the virtual player 300 continuously moves from the position in the defense mode shown in FIG. 7A to the position in the attack mode shown in FIG. 7C. According to this movement, the game scene in the display also changes continuously from the scene of FIG. 4 to the scene of FIG. 6.

In the attack mode, the player can attack the enemies 330. However, the enemies 330 can also attack the virtual player 300. The virtual player 300 could be damaged by the enemies 330. If the foot-operated input section 30 is released, the game will return to the defense mode and the virtual player will be able to avoid the attacks from the enemies 330.

At this time, the view point 302 of the virtual player 300 continuously moves from the position in the attack mode shown in FIG. 7C to the position in the defense mode shown in FIG. 7A. According to this movement, the game scene in the display also changes continuously from the scene of FIG. 6 to the scene of FIG. 4.

In the shooting game machine of this embodiment, the player can enjoy the shooting combat by properly using the attack and defense modes in the game space.

The foot-operated input section 30 comprises the pedal 32 on which the player steps with his or her foot and a pressure sensor 34 for sensing a pressure put on the pedal 32.

The pressure value sensed at the foot-operated input section 30 is then inputted into the game computing section 110 wherein the game computation in the attack and defense modes is carried out based on the inputted pressure value.

The game is in the attack mode when the player steps on the pedal 32, and the game is in the defense mode when no pressure is put on the pedal 32. When the pressure value becomes equal to or more than a given value, the game computing section 110 changes the game mode from the defense mode to the attack mode. The computation for the attack mode is continued by the game computing section 110 as far as the pressure value is not less than the given value. When the pressure value becomes below the given value, the attack mode is switched to the defense mode. The computation for the defense mode is continued by the game computing section 110 as far as the pressure value is below the given value.

When the attack mode is switched to the defense mode or vice versa, more particularly, the game computing section 110 changes the position of the virtual player 300 in the virtual three-dimensional game space and controls the attack ability of the player and enemies.

The change and control may be carried out by the game computing section 110 as follows.

When the pressure value at the pedal is below the given value, the game computing section 110 determines that the game is in the defense mode and performs a computation to hide the virtual player 300 behind the wooden box 340, as shown in FIG. 7A. When the game computing section 110 determines that the virtual player 300 is shot by the enemies 330 in the game space, the player is determined to be damaged. Since the enemies 330 cannot hit the virtual player 300 because of the wooden box 340 in the defense mode, the player will not be damaged by the attack of the enemies in the defense mode.

When the pressure value becomes equal to or more than the given value, the game computing section 110 determines that the game is in the attack mode and performs a computation to let the virtual player 300 come out from behind the wooden box 340, as shown in FIG. 7C. So that in the attack mode, the enemies can hit the virtual player 300 at a given rate because the wooden box 340 does not hide the virtual player 300. If the virtual player 300 is shot by the enemies, the player will be damaged and lose one of the "lives". The hit rate is determined by an attack ability control section 114 in the game computing section 110, as will be described later.

Figure 6:
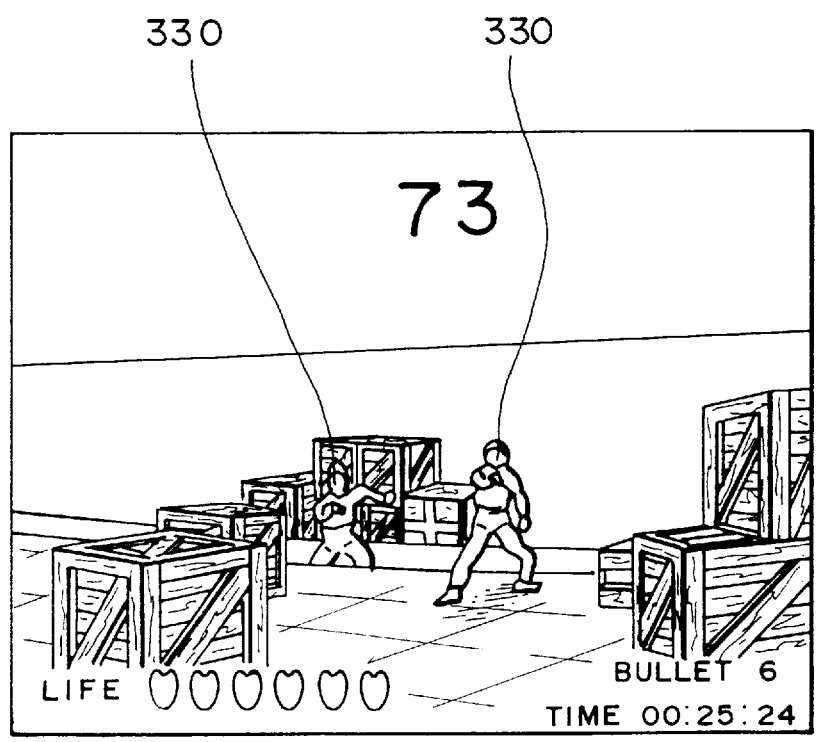
FIG. 6 illustrates a further game scene in the present embodiment.

In the shooting game machine of this embodiment, the game scene of FIG. 4 which is a view from the viewpoint 302 of the virtual player 300 in FIG. 7A is displayed in the defense mode, and the game scene of FIG. 6 which is a view from the viewpoint 302 of the virtual player 300 in FIG. 7C is displayed in the attack mode. The view changes depending on the position of the viewpoint 302 of the virtual player 300. Therefore, when the position of the virtual player 300 is changed, the game computing section 110 computes the coordinates of the viewpoint of the virtual player 300. Then, the image synthesizing section 120 synthesizes an image to be displayed on the display according to the computed coordinates of the viewpoint of the virtual player 300.

When the pedal is stepped on in the defense mode, the display shows a continuous transition of the game scene from the defense mode to the attack mode. More particularly, the game scene changes continuously from the view image in the defense mode shown in FIG. 4 to the view image in the attack mode shown in FIG. 6.

When the pedal is released in the attack mode, the display shows a continuous transition from the attack mode to the defense mode. More particularly, the game scene changes continuously from the view image in the attack mode shown in FIG. 6 to the view image in the defense mode shown in FIG. 4.

When the pedal 32 is stepped on by the player and the pressure value becomes equal to or more than the given value (except when the pressure value greatly exceeds the given value), the position of the virtual player 300 is changed from the position as shown in FIGS. 7A through FIG. 7B to FIG. 7C. If the pedal 32 is released before the position of the virtual player 300 becomes the position of FIG. 7C, however, the position of the virtual player will return from that of FIG. 7B to that of FIG. 7A. In this case, the game scene changes from FIG. 4 to FIG. 5, and then returns to FIG. 4, meaning that the virtual player puts his or her head out from behind the box, senses danger, and then hides again.

When the pedal 32 is released and the pressure value becomes below the given value, the position of the virtual player 300 is changed from the position as shown in FIG. 7C through FIG. 7B to FIG. 7A. If the pedal 32 is again stepped on before the position of the virtual player 300 becomes the position of FIG. 7A, however, the position of the virtual player will return from that of FIG. 7B to that of FIG. 7C. In this case, the game scene changes from FIG. 6 to FIG. 5, and then returns to FIG. 6, meaning that the virtual player hides behind the wooden box except his or her head, judges that it is safe, and then comes out again to attack the enemies.

In the defense mode, the player cannot be damaged by the attacks of the enemies 330 and the enemies cannot also be attacked by the player. In other words, the attack abilities of the enemies 330 and player are controlled such that all the attacks of the enemies 330 miss the virtual player and that any input from the player's gun is not received by the machine.

In the shooting game machine of this embodiment, each of the enemies 330 in the game can be set to have a different hit rate. According to the hit rate, the imaginary bullets shot by the corresponding enemy are classified into a miss, a graze and a hit which are set to provide the total rate equal to 100%.

Figure 8A:
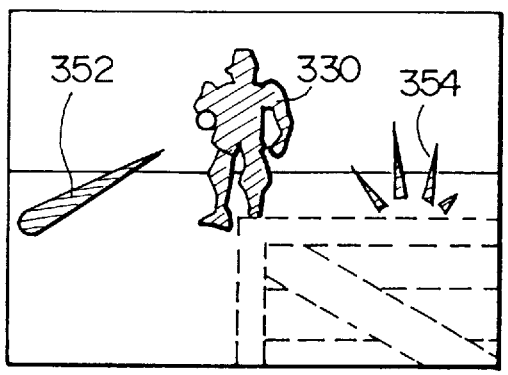
FIGS. 8A–8C illustrate game scenes in which enemy's bullets miss, graze, and hit the virtual player, respectively.
Figure 8B:
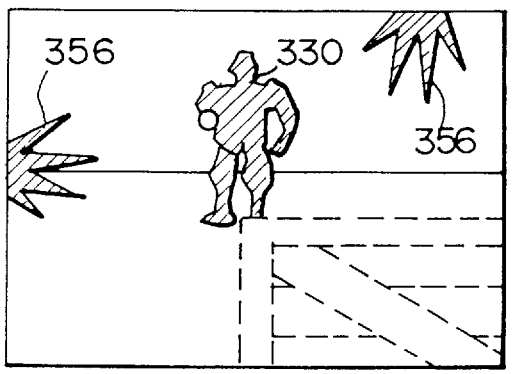
Figure 8C:
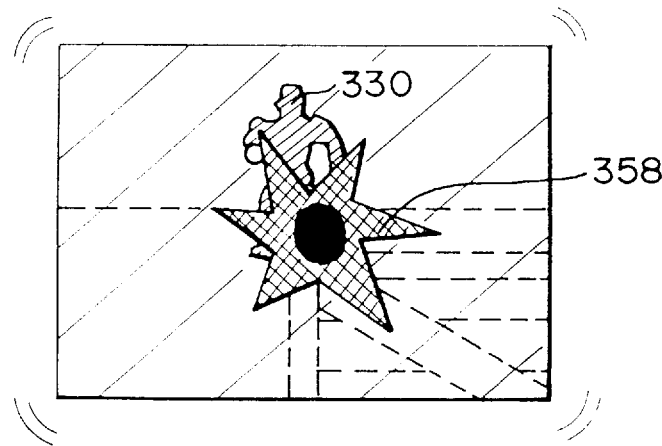

FIGS. 8A–8C show three scenes in which a bullet shot by an enemy 330 misses, grazes and hits the virtual player 300, respectively.

FIG. 8A shows the case where a bullet misses the virtual player. The missed bullet is changed into a ricochet effect 354 when it hits any obstruction. The position of the obstruction is randomly selected from various preset coordinates. At this time, the player will not be damaged by the ricochet.

FIG. 8B shows the case where a bullet grazes the virtual player. The grazed bullet is changed into a graze effect 356 when it strikes an edge of the screen. At the same time, the game scene is slightly vibrated and momentarily flashed into red color. Similarly, the player will not be damaged by the grazing bullet at this time.

FIG. 8C shows the case where a bullet hits the virtual player. The bullet impacts on the central area of the screen and then is changed into a hit effect 358. The game scene is colored red and is greatly shaken during next 100 interlaced scannings. The hit bullet is changed into various effects depending on the enemy's arms (e.g., a crater in the case of gun; an explosion in the case of bazooka; and a scratch in the case of nail). While the game scene is being shaken, it may be set that the player necessarily misses the enemy 330 or that the player cannot shoot the gun. Thus, the player will lose a given time when the player is damaged. At the same time, one of the "lives" is lost.

In such a manner, the player is always exposed to the attacks of the enemies 330 in the attack mode. As described, the enemies 330 will hit the virtual player 300 with a given rate.

When the hit rate is set to be comparatively high, the virtual player is frequently hit by the enemies 330 without attacking immediately after the player shifts to the attack mode. Particularly, the beginner tends to be defeated immediately after the game has started since the beginner has difficulty in grasping the rhythm in the attacks of the enemies 330. As a result, the beginner cannot enjoy the game.

When the hit rate is too low, however, the virtual player will not be easily hit by the enemies 330. In this case, the player cannot keep the tension in shooting while properly using the attack and defense modes and will lose interest in the game.

The shooting game machine of this embodiment is therefore designed such that the attack ability of the enemies 330 is first lower and then gradually increases in the attack mode. It is further designed such that once the player shifts from the attack mode to the defense mode and then returns to the attack mode, the attack ability of the enemies 330 is reset and thereafter gradually increases.

To control the attack ability of the enemies 330 based on the duration of the attack, the game computing section 110 of this embodiment comprises a timer section 116 for measuring the duration of the attack mode and an attack ability control section 114 for increasing the attack ability of the enemies as the duration measured by the timer section 116 becomes longer.

The timer section 116 initiates measuring when the pressure value at the pedal 32 stepped on by the player becomes equal to or more than a given value and the defense mode is changed to the attack mode. The timer section 116 is reset when the attack mode is changed to the defense mode. Thus, the timer section 116 will measure the duration from the initiation of the attack mode.

As described, the attack ability of the enemies 330 is determined by the hit rate. The attack ability control section 114 controls the attack ability of the enemies 330 by controlling the hit rate. More particularly, the attack ability control section 114 periodically checks the measurement by the timer section 116 in the attack mode. As the measurement increases, the attack ability control section 114 increases the hit rate. In the defense mode, the attack ability control section 114 sets the hit rate of the enemies 330 at zero. This means that the player will not be damaged by the attacks of the enemies 330.

Such a design provides less possibility that the player will be defeated immediately after the player has shifted to the attack mode. This can prevent the case where the game will be terminated before the beginner enjoys the game. Since the attack ability of the enemies 330 increases as the duration of the attack mode becomes longer, the player has to suitably judge whether or not the attack and defense modes should be switched from one to another.

Although the shooting game machine of this embodiment has been described to control the attack ability of the enemies based on the duration of the attack mode, it may be so designed that the number of attacks by the enemies is counted from the beginning of the attack mode, thereby controlling the attack ability of the enemies based on the counted number of attacks.

The shooting game machine of this embodiment is designed such that the player uses a six-chambered gun. When the player has finished the six bullets, the player cannot attack the enemies. The player has to shift to the defense mode and reload in order to restart the attack.

Figure 9:
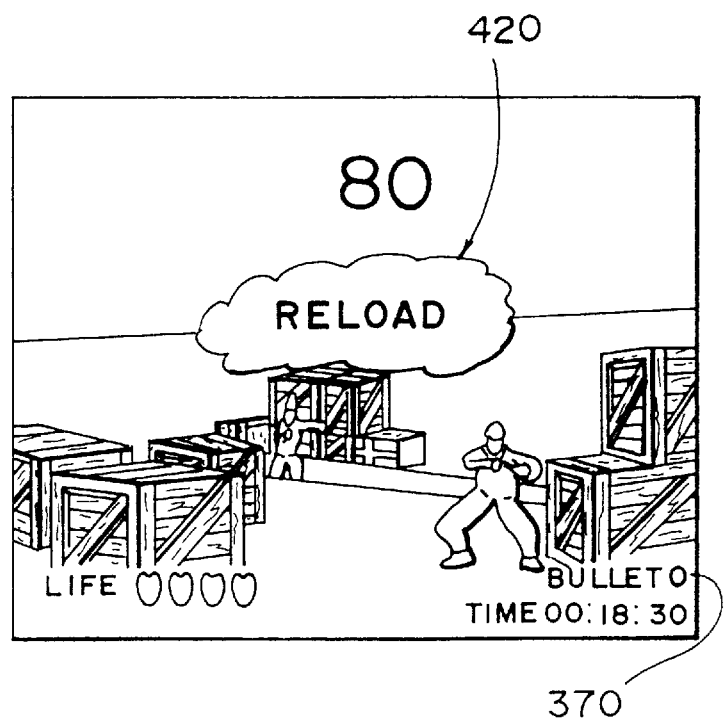
FIG. 9 illustrates a further game scene in the present embodiment.
Figure 10:
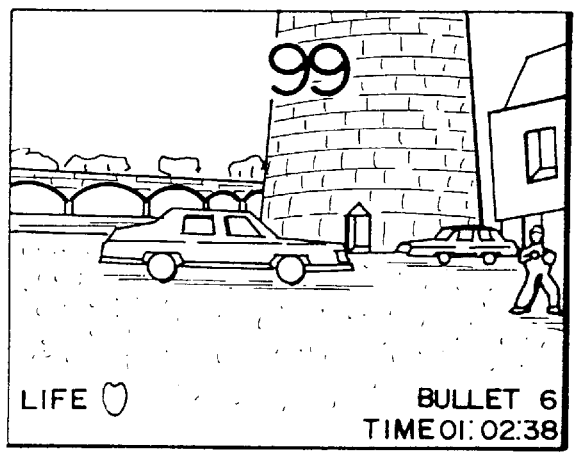
FIG. 10 illustrates a further game scene in the present embodiment.

FIG. 9 shows an example wherein the player is to shoot the seventh bullet though all the six bullets have been consumed. Since the number of remaining bullets is zero, the indication of the number of the remaining bullets 370 at the rightward and lower part of the screen is also displayed to be zero. A "RELOAD" massage 420 represented by translucent letters appears in the screen at the lower part thereof and then moves to the central part of the screen. When the pedal is released to perform reloading, the "RELOAD" massage 420 disappears and the display shows a defense mode scene as shown in FIG. 4. As the result of reloading, the indication of the number of the remaining bullets 370 at the rightward and lower part of the screen shows "6".

In order to control the number of remaining bullets of the player, the shooting game machine of this embodiment provides a storage area (not shown) for storing the number of remaining bullets in the game computing section 110. Based on the number of remaining bullets stored in this storage area, the game computing section 110 directs the image synthesizing section 120 to display the number of remaining bullets 370 and the "RELOAD" massage 420.

To reload new bullets when the player shifts to the defense mode, the game computing section 110 includes a reload control section 112. When the player releases the pedal 32 and if the pressure value becomes below the given value, the reload control section 112 resets the number of remaining bullets in the storage area into "6".

Since the player reloads new bullets when the attack mode is switched to the defense mode, the player can spontaneously switch the attack and defense modes from one to another.

The foot-operated input section 30 also functions as shift pattern input means for inputting a shift pattern from the defense mode to the attack mode.

More particularly, the game machine of this embodiment is designed such that when the pedal 32 is quickly stepped on by the player, the virtual player 300 shifts from the defense mode to the attack mode quickly. The game machine shows such a shift through the change of the view of the virtual player 300 on the display.

Figure 5:
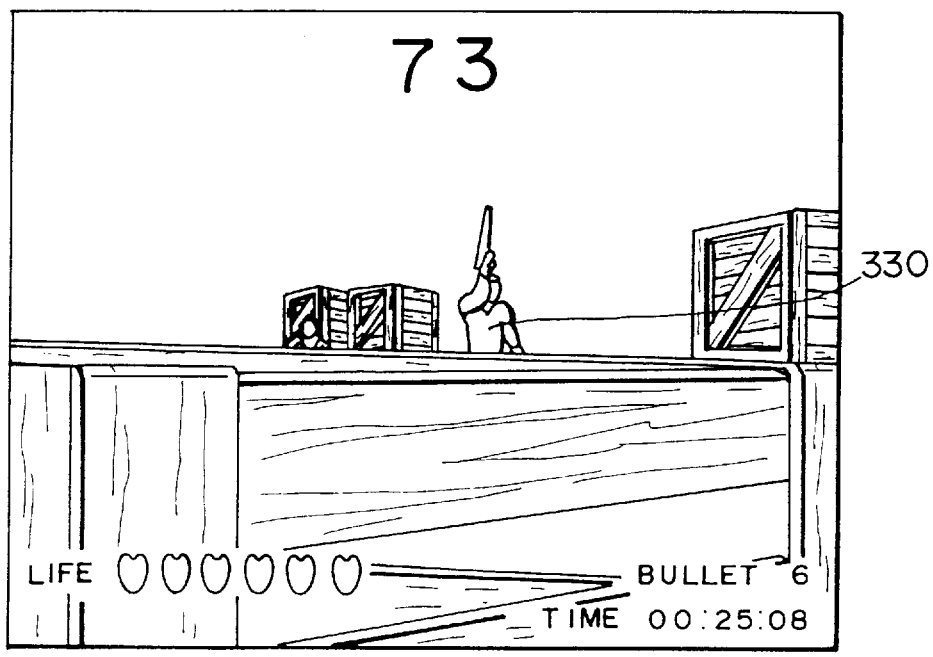
FIG. 5 illustrates still another game scene in the present embodiment.

Normally, a shift from the defense mode to the attack mode directed by the player through the pedal is displayed on the screen as a change of game scene in the course of about 60 interlaced scannings as shown in FIGS. 4, 5 and 6. When the player presses the pedal 32 quickly, however, time required to perform this shift is reduced to about a half. The game scene in the middle of the quick shift to the attack mode is represented as a view from a higher viewpoint than that of FIG. 5 to show that the virtual player is jumping.

The computing section 110 determines whether or not the pedal is quickly pressed on the basis of the pressure value sensed by the pressure sensor of the foot-operated input section 30.

When the pressure value becomes equal to or slightly more than a given value, the computing section 110 carries out a computation for a normal shift to the attack mode. If the pressure value substantially exceeds the given value, the computing section 110 computes to perform the quick shift to the attack mode.

Items from which the virtual player must defend itself are not limited to the attacks of the enemies 330. In the shooting game machine of this embodiment, any other object such as a car dashing toward the virtual player, a hook suspending from a ceiling may be provided for damaging the virtual player.

Figure 11:
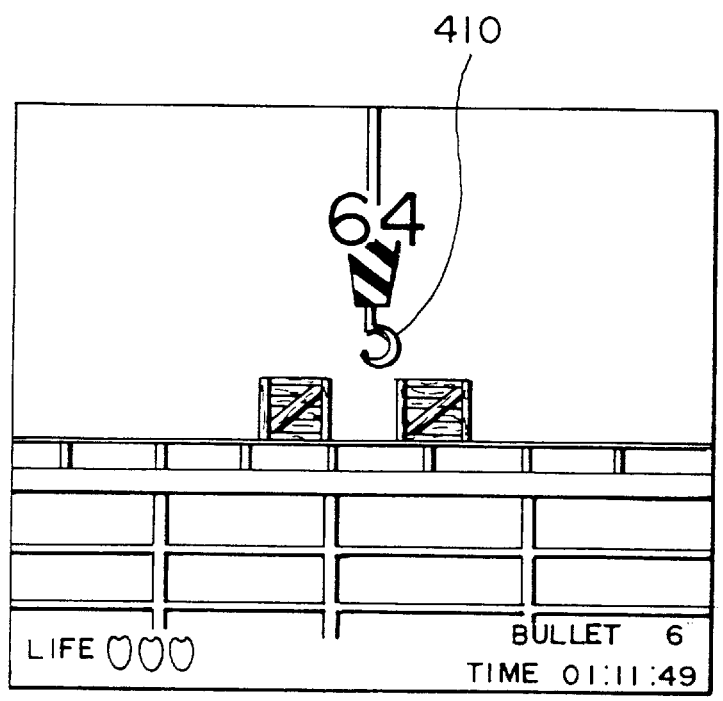
FIG. 11 illustrates a further game scene in the present embodiment.

FIG. 11 shows a game scene wherein a hook 410 suspended from a ceiling is displayed. The hook 410 swings toward the virtual player. If the player does not shift to the defense mode to avoid the hook 410, the hook impacts the virtual player to damage it. Thus, the player must select the defense mode when such a danger is to be avoided.

The virtual player does not always hide for defense. For example, the shooting game machine of this embodiment may provide such a shooting point as shown in FIG. 11. At this shooting point, there is not anything behind which the virtual player 300 can hide. When the player selects the defense mode, the virtual player 300 lies down on the ground to avoid the attacks of the enemies 330.

Figure 12:
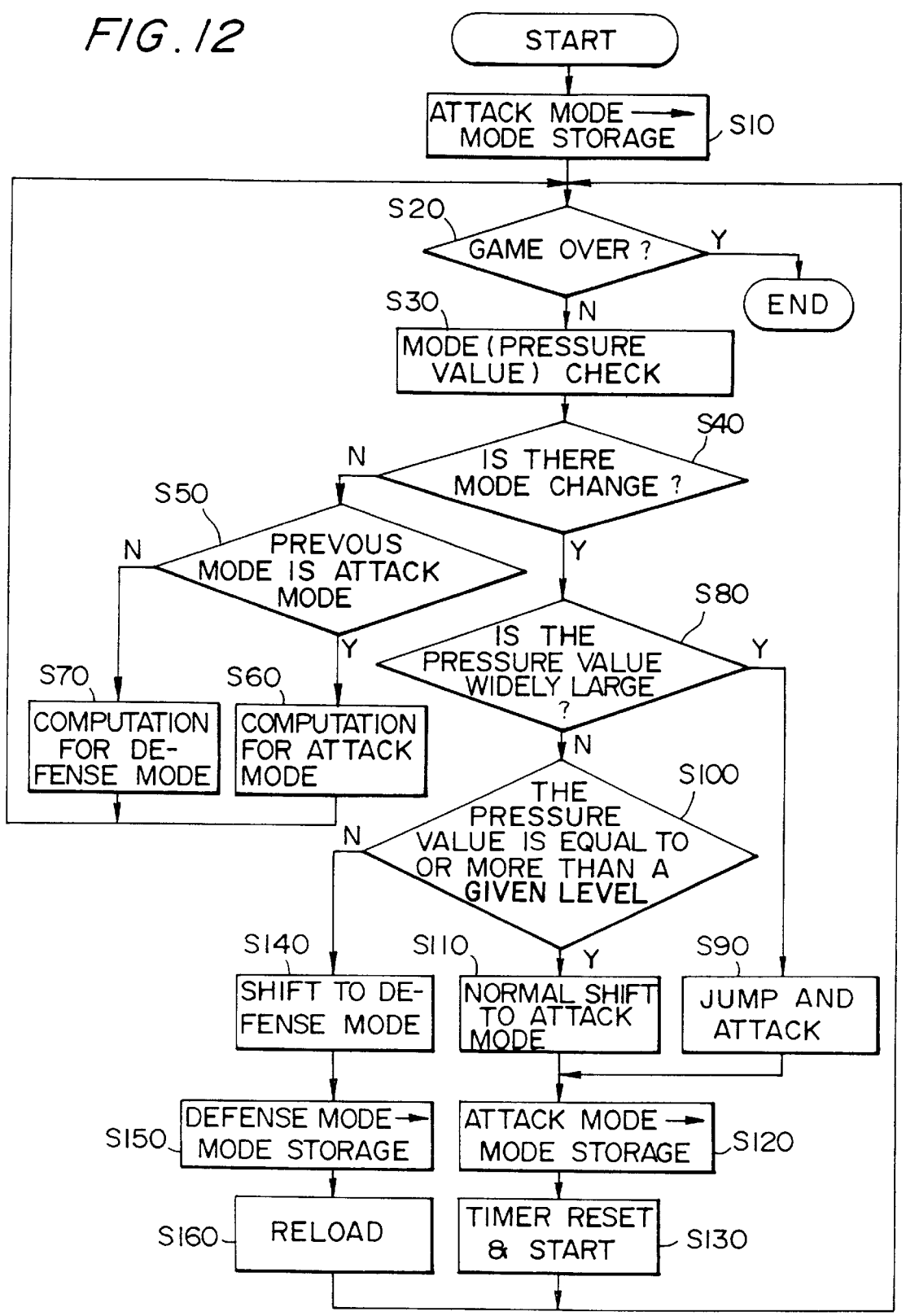
FIG. 12 is a flow chart illustrating a procedure in the game computing section which performs the game computation relating to the attack and defense modes.

FIG. 12 is a flow chart illustrating a procedure of shooting game computation in the game computing section 110 of this embodiment.

As the game starts, the defense mode is first selected and the selection is stored by a mode storage section in a storage area (not shown) of the game computing section 110 (step 10). The mode storage section functions as an area for storing the previous input of the mode for sensing the mode change.

The following computation will be repeated until the game is over (step 10).

The shooting game machine of this embodiment supplies a game image to the screen at every 1/60 second. Thus, as a rule, the game computing section 110 checks the pressure value inputted from the foot-operated input section 30 at these intervals (step 30). The game computing section 110 determines whether or not the mode is changed based on the checked pressure value (step 40).

When the previous mode is the attack mode and there is no change (step 50), the game computation section 110 performs a computation for the attack mode (step 60). When the previous mode is the defense mode and there is no change (step 50), a computation for the defense mode is performed (step 70).

When the checked mode is different from the previous mode, the game computation section 110 computes for a shift between the attack mode and the defense mode.

When a pressure value inputted from the foot-operated input section 30 substantially exceeds the given value (step 80), the game computation section 110 computes for a quick shift to the attack mode wherein the virtual player 300 jumps to attack the enemies (step 90). When the pressure value is equal to or slightly more than the given value (step 100), the game computing section 110 computes for the normal shift to the attack mode (step 110). In any event, the mode change to the attack mode is stored in the mode storage section (step 120) and then the timer is reset (step 130).

If the checked pressure value is below the given value (step 100), the game computing section 110 computes for a shift to the defense mode (step 140). This change to the defense mode is stored in the mode storage section (step 150) and reloading is carried out (step 160).

The present invention is not limited to the aforementioned embodiment, and various modifications can be made.

Although the foot-operated input section 30 is used as a mode selecting means in this embodiment, various other means can be used.

For example, an inclination sensor utilizing the conductivity of mercury may be used as a mode selecting means, wherein the inclination sensor is included in a shooting device. When the inclination sensor senses a given inclination of the shooting device, electricity is conducted through the mode selecting means. Since the selection of the attack or defense mode can be made by conduction of electricity, begginers can operate the game machine without difficulty.

The attack or defense mode may be selected by detecting a player's position. A player wears at least one unit including an infrared emitting device, and at least three infrared sensors are disposed around the player in a nonlinear pattern. The position of the player is detected on the basis of infrared sensing time lag between the three infrared sensors. A position determining means determines whether it is the attack mode or the defense mode based on the detected player's position. In this way, the attack mode or the defense mode can be selected by the player who moves between an attack mode position and a defense mode position as watching the game scene on the display.

In addition, a reflection type infrared sensor directed toward the head of a standing player may be used to sense the position of the player. In this case, the player can select the attack or defense mode by selecting standing or squatting position.

Thus, the player can select the attack or defense mode by moving between the attack and defense mode positions. Therefore, the player can enjoy the shooting game as if in an actual combat.

Various types of defense mode positions for avoiding the attacks of the enemies such as a position behind something may be set for different game contents. The player thus can enjoy the virtual combat in the different game spaces on the display.

It is preferred that the display is in the form of a head-mount display. Since all the field of view of the player is in the game space, the player can feel as if he or she is actually placed within the game space. Thus, a shooting game machine with which a player can enjoy the virtual combat can be provided.

The present invention is not limited to the gun shooting game, but may be applied to any other shooting game machine using a shooting device.

Figure 13:
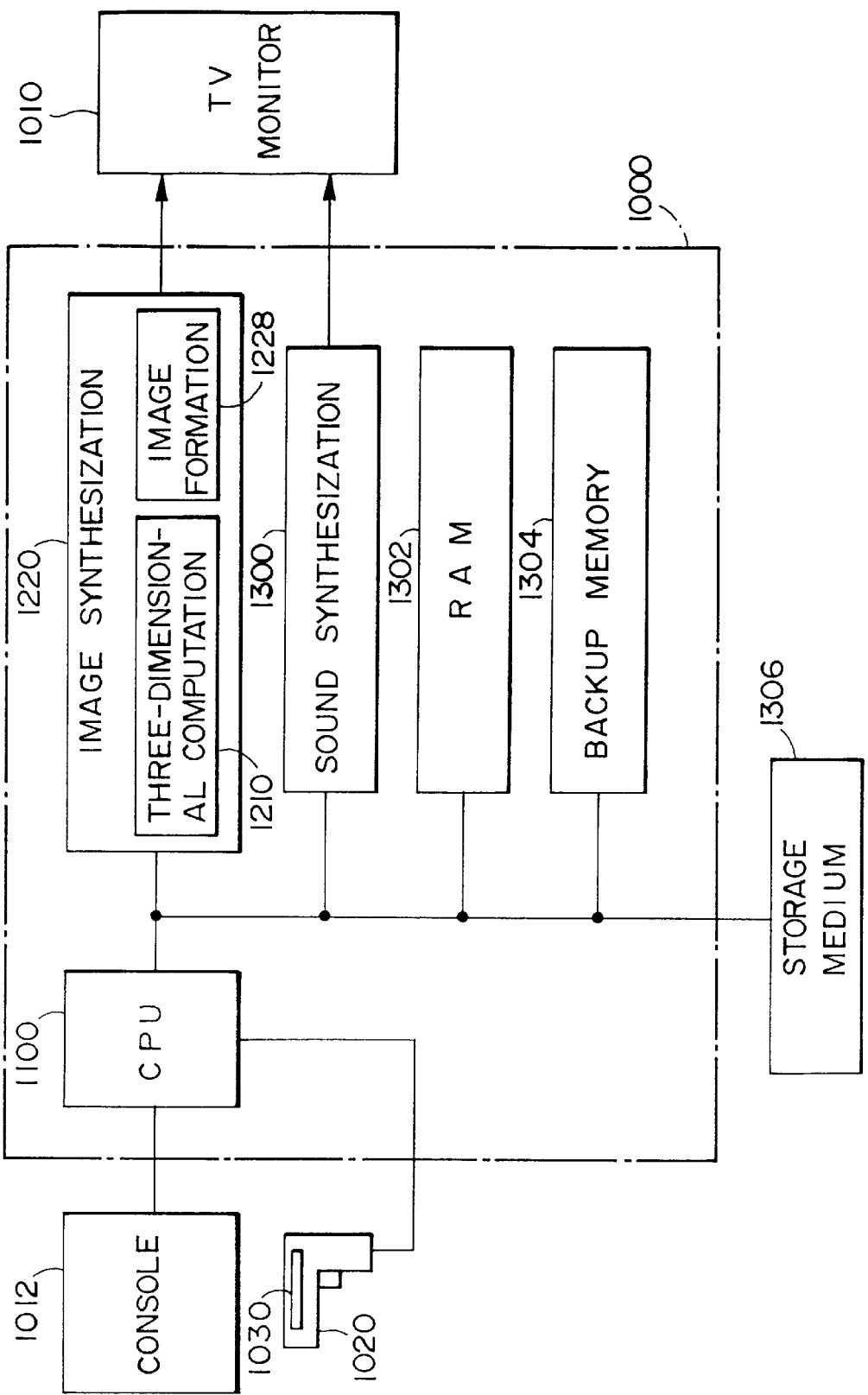
FIG. 13 is a block diagram of a shooting game machine according to another embodiment of the present invention.

Furthermore, the present invention can be applied not only to arcade shooting game machines, but also domestic game machines. FIG. 13 shows a block diagram of a domestic game machine to which the present invention is applied. This game machine comprises a main machine body 1000, a console 1012, a shooting device 1020 and a storage medium (CD-ROM, game cassette, memory card or the like) 1306. Produced images and sounds are outputted toward a TV monitor 1010 or the like. The game machine further comprises a gun including an inclination sensor 1030 which utilizes the conductivity of mercury. The inclination sensor 1030 functions as a mode selecting means. The main machine body 1000 comprises a CPU 1100, a three-dimensional computing unit 1210, an image synthesizing unit 1220 including an image forming section 1228, a sound synthesizing unit 1300, a working RAM 1302 and a data backup memory (memory card or the like) 1304.

In such a domestic game machine, the CPU 1100 executes a program stored in the storage medium 1306 through the RAM 1302 and functions as game computing means, timer means, attack ability control means and reloading means.

It is preferred that the storage medium 1306 has stored information which is used to cause the player to use the mode selecting means for selecting the attack or defense mode during the game; information which is used to perform a game computation for shooting action between the player and enemies in the game space, based on the input through the shooting device in the attack mode; and information which is used to perform a game computation for the virtual player in the game space to avoid danger in the defense mode.

The present invention may be applied to a so-called multimedia terminal system or a large-scale attraction type game system in which a number of players entry a game.

An exclusive image processing device may be used to make such a computation as carried out in the image synthesizing section shown in FIG. 2, the image synthesizing section in the domestic game machine of FIG. 13. This processing operation may be executed by a general-purpose microcomputer, DPS or the like in a software manner.

The structure and procedure of the game computing section also are not limited to those of the described and illustrated embodiments.

The present invention covers such a display as known by a head-mount display (HMD) on which the synthesized game images are displayed.

What is claimed is:

1. A shooting game machine for shooting at a target displayed on a display, comprising:

selecting means used by a player for selecting a defense mode; and computing means for causing a virtual player in a game space to avoid danger when said defense mode is selected so that said virtual player cannot be damaged by the enemy.

2. A shooting game machine comprising:

display means for displaying a game scene of a game space;

a shooting device;

mode selecting means for selecting one of an attack mode and a defense mode;

game computing means responsive to an input from said shooting device for (i) performing a game computation causing a virtual player and an enemy in the game space to shoot at each other when said attack mode is selected, and (ii) performing a game computation causing said virtual player in the game space to avoid danger when said defense mode is selected.

3. The shooting game machine according to claim 2, wherein said mode selecting means is in a form of a foot-operated input means which is operated by the player to select one of said attack mode and said defense mode.

4. The shooting game machine according to claim 2, wherein said mode selecting means includes an inclination sensor which is disposed in said shooting device for sensing a given inclination of said shooting device operated by the player and wherein said mode selecting means selects one of said attack mode and said defense mode on the basis of sensed inlination of said shooting device.

5. The shooting game machine according to claim 2, wherein said mode selecting means includes:

player position detecting means for detecting a position of the virtual player; and position determining means for determining whether said mode selecting means is in said attack mode or in said defense mode based on a detected position of the virtual player; and wherein the player selects one of said attack mode and said defense mode by moving between an attack mode position and a defense mode position while watching the game scene on said display means.

6. The shooting game machine according to claim 2, wherein said game computing means comprises:

timer means for measuring duration of said attack mode selected by said mode selecting means; and attack ability control means for varying an attack ability of the enemy according to the measured duration.

7. The shooting game machine according to claim 2, wherein said game computing means comprises:

attack frequency measuring means for measuring an attack frequency of the enemy during said attack mode selected by said mode selecting means; and attack ability control means for varying an, attack ability of the enemy according to the attack frequency measured by said attack frequency measuring means.

8. The shooting game machine according to claim 2, wherein said game computing means comprises a reload control means for reloading an attack ability of the player in response to a shift between said attack mode and said defense mode.

9. The shooting game machine according to claim 2, wherein said foot-operated input means comprises a shift pattern input means for inputting a shift pattern from said defense mode to said attack mode; and wherein said game computing means performs a computation based on an inputted shift pattern for an action of said virtual player shifting from said defense mode to said attack mode.

10. The shooting game machine according to claim 9, wherein said shift pattern input means includes a pressure sensor for sensing a pressure applied by the player to input a shift pattern according to the sensed pressure.

11. The shooting game machine according to claim 2, wherein said display means is a head-mount display.

12. A method of computing performed in a shooting game machine, the shooting game machine including a mode selecting means for selecting one of an attack mode and a defense mode, and a shooting device for shooting at a target displayed on a display, said method comprising the steps of:

computing for determining whether a mode of the shooting game machine has been changed (i) from said attack mode to said defense mode, or (ii) from said defense mode to said attack mode, by a player of a shooting game through use of said mode selecting means;

computing for a shooting combat against an enemy in a game scene of a game space displayed on the display based on an input from said shooting device when said attack mode is selected; and computing for causing a virtual player in the game scene of the game space to avoid danger by said enemy when said defense mode is selected so that said virtual player cannot be damaged by the enemy.

13. An information storage medium having a computer-readable program stored therein for playing a shooting game in a shooting game machine, the shooting game machine including a mode selecting means for selecting one of an attack mode and a defense mode, and a shooting device for shooting at a target displayed on a display, the program being executable by the computer to perform the method steps comprising:

computing for determining whether a mode of the shooting game machine has been changed (i) from said attack mode to said defense mode, or (ii) from said defense mode to said attack mode, by a player of a shooting game through use of said mode selecting means;

computing for a shooting combat against an enemy in a game scene of a game space displayed on the display based on an input from said shooting device, when said attack mode is selected; and computing for causing a virtual player in the game scene of the game space displayed on the display to avoid danger, when said defense mode is selected so that said virtual player cannot be damaged by the enemy.

14. In combination:
a) a shooting game machine comprising:
   a display which displays a game scene of a game space,
   a computer;
   a shooting device;
   mode selecting means for selecting one of an attack mode and a defense mode;
   game computing means responsive to an input from said shooting device (i) for performing a game computation causing a virtual player and an enemy in the game space to shoot at each other when said attack mode is selected, and (ii) for performing a game computation causing said virtual player in the game space to avoid danger when said defense mode is selected; and
b) an information storage medium having a program readable by said computer stored therein, the program being executable by the computer to:
   compute to determine whether a mode of the shooting game machine has been changed (i) from said attack mode to said defense mode, or (ii) from said defense mode to said attack mode, by a player of a shooting game through using said mode selecting means;
   compute a shooting combat against an enemy in the game scene of the game space displayed on the display based on input from the said shooting device, when said attack mode is selected; and
   compute for causing a virtual player in the game scene of the game space displayed on the display to avoid danger, when said defense mode is selected.

15. The shooting game of claim 1, wherein all attacks by the enemy miss the virtual player regardless of whether the attack would have otherwise caused damage to the virtual player, when the defense mode is selected.

16. The shooting game of claim 2, wherein the display means displays the game scene from the viewpoint of the virtual player (i) in said attack mode when said attack mode is selected, and (ii) in said defense mode when said defense mode is selected.

* * * * *